Dec. 4, 1962 H. HELL 3,066,588
MOUNTING ARRANGEMENT FOR CAMERA WALLS OR THE LIKE
Filed Dec. 18, 1959 4 Sheets-Sheet 1
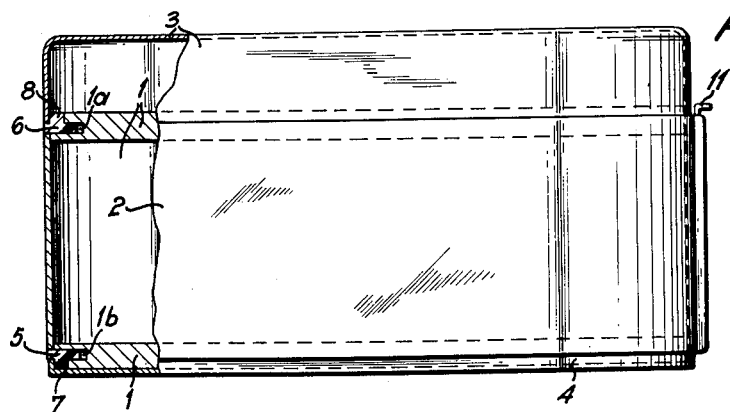
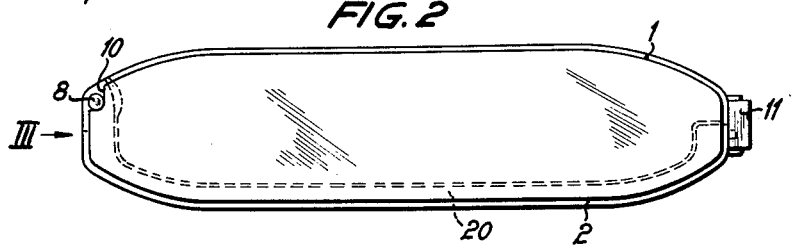
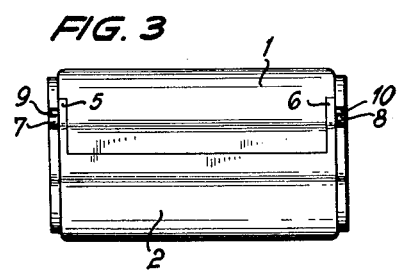
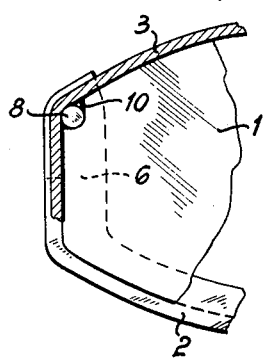
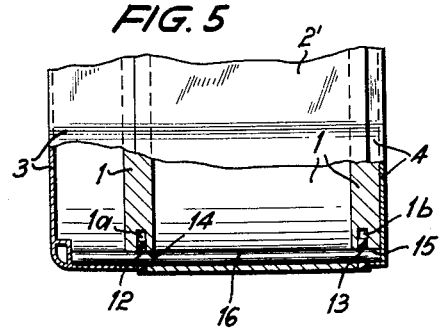
INVENTOR
Hans Hell
by:
Michael S. Striker
Attorney Dec. 4, 1962 H. HELL 3,066,588
MOUNTING ARRANGEMENT FOR CAMERA WALLS OR THE LIKE
Filed Dec. 18, 1959 4 Sheets-Sheet 2

INVENTOR
Hans Hell
by:
Michael S. Striker

Dec. 4, 1962 H. HELL 3,066,588
MOUNTING ARRANGEMENT FOR CAMERA WALLS OR THE LIKE
Filed Dec. 18, 1959 4 Sheets-Sheet 3

INVENTOR
Hans Hell
by:
Michael S. Striker
Attorney

Dec. 4, 1962 H. HELL 3,066,588
MOUNTING ARRANGEMENT FOR CAMERA WALLS OR THE LIKE
Filed Dec. 18, 1959 4 Sheets-Sheet 4
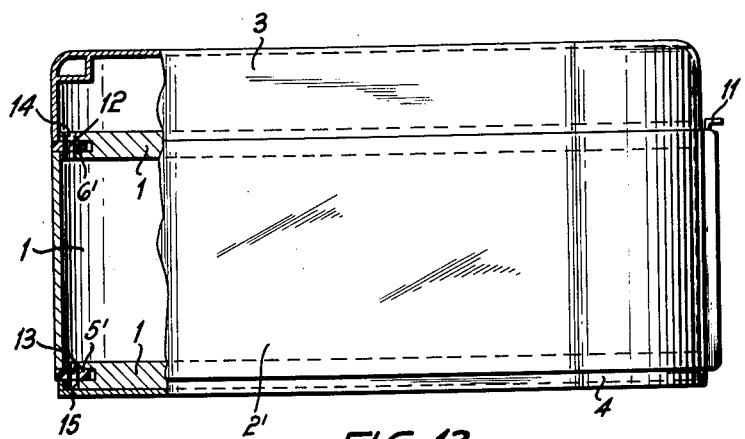
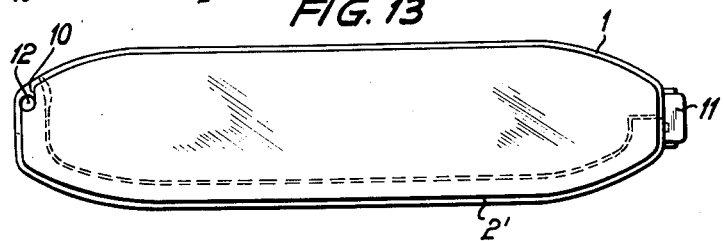
INVENTOR
Hans Hell
by:
Michael S. Striker
Attorney United States Patent Office 3,066,588
Patented Dec. 4, 1962

3,066,588
MOUNTING ARRANGEMENT FOR CAMERA
WALLS OR THE LIKE
Hans Hell, Wiesbaden-Freudenberg, Germany, assignor to Adox Kamerawerk G.m.b.H., Wiesbaden-Biebrich, Germany
Filed Dec. 18, 1959, Ser. No. 860,475
Claims priority, application Germany Dec. 20, 1958
9 Claims. (Cl. 95—11)

The present invention relates to hinge arrangements particularly of the type which are suitable for use in cameras, for example, at the connection between the rear wall of the camera and the camera housing.

Hinge connections of this type at the present time require many operations to be manufactured properly particularly where light-tightness is essential as in the case of cameras. Many of these conventional hinge connections require relatively long thin hinge rods to be passed through the long bores, which requires additional careful and laborious operations.

One of the objects of the present invention is to overcome the above drawbacks by providing an exceedingly simple hinge arrangement which is far less expensive to manufacture and maintain than conventional hinge arrangements and which at the same time will operate reliably both with respect to long life as well as with respect to light-tightness in the case of cameras.

Another object of the present invention is to provide a hinge arrangement of the above type which utilizes components which serve other functions in order to participate in the operation of the hinge assembly itself.

With the above objects in view the invention includes in a hinge arrangement a housing which is open at one side and which has top and bottom walls formed at one end with a pair of grooves, respectively, these top and bottom walls additionally being formed with cutouts extending respectively from the grooves to the top and bottom faces of the top and bottom walls. These top and bottom walls respectively carry upper and lower cap members into which these cutouts extend, respectively. A closure wall is carried by the housing at the open side thereof for opening and closing the housing, and this closure wall has a pair of hinge wings extending slidably into the grooves. A pivot means is operatively connected with the hinge wings to form a turning axis for the closure wall, and the upper and lower cap members cooperate with the pivot means to maintain the latter in an operative position.

The novel features which are considered as characteristic for the invention are set forth in particular in the appended claims. The invention itself, however, both as to its additional objects and advantages thereof, will be best understood from the following description of specific embodiments when read in connection with the accompanying drawings, in which:

FIG. 1 is an elevation of a camera as seen from the rear with the left portion of FIG. 1 illustrated in section;

FIG. 2 is a top plan view of the structure of FIG. 1 with the viewfinder housing of FIG. 1 eliminated;

FIG. 3 is a view of the structure of FIG. 2 as seen from the left of FIG. 2 in the direction of the arrow III;

FIG. 4 is a view of the structure shown at the left of FIG. 2 on an enlarged scale with part of the viewfinder housing shown in section;

FIG. 5 is a sectional elevation of the part of a camera housing to which the rear wall is hinger, the embodiment of FIG. 5 being different from that of FIGS. 1–4;

FIG. 12 is an elevation of the embodiment of FIG. 5 is seen from the rear with the left portion in section; and FIG. 13 is a top plan view of the structure of FIG. 12 with the viewfinder housing removed.

Figure 6:
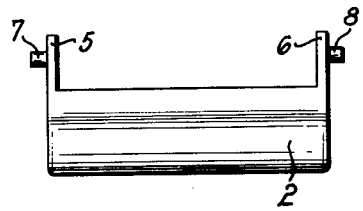
FIG. 6 is an end view of the rear wall of the camera housing of FIGS. 1–4 showing the part of the hinge assembly which is connected with this rear wall.

Referring now to the drawings and to FIGS. 1–4 and 6–8 in particular, the invention is shown as applied to a camera which includes a camera housing 1 having top and bottom walls and being open at the rear where a pivoted rear closure wall 2 is located. At its left end the housing 1 is formed in its top wall with a groove 1a and at its bottom wall with a groove 1b (FIG. 1) and in addition the top wall of the housing 1 is formed with a cutout or notch 10 (FIG. 2) extending from the groove 1a up to the top face of the top wall of the housing 1, and at its bottom wall the housing 1 is formed with a cutout or notch 9 extending from the groove 1b to the bottom face of the bottom wall, this notch 9 being shown in FIG. 3 where the structure is illustrated without the bottom cap member described below as well as without the upper cap member which forms the viewfinder housing. This viewfinder housing 3 forms an upper cap member fastened to the upper wall of the housing 1 through any suitable screws or the like, and in a similar way a bottom cap member 4 is fixed to the bottom wall of the housing 1.

Figure 8:
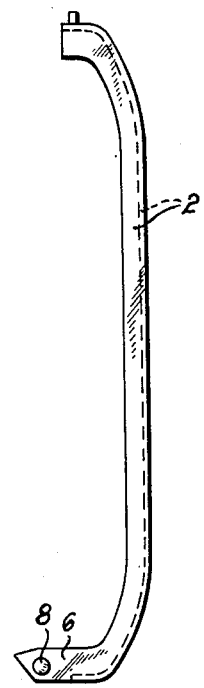
FIG. 8 is an end view of the structure of FIG. 7 as seen from the right of FIG. 7.
Figure 7:
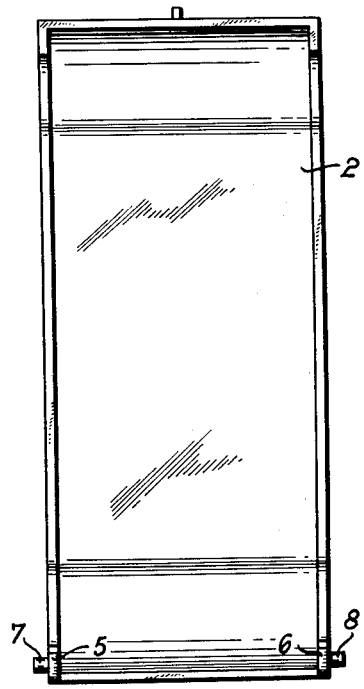
FIG. 7 is a top plan view of the structure of FIG. 6.

As is shown most clearly in FIGS. 6–8 the rear wall 2 of the camera housing has integrally formed therewith a pair of hinge wings 5 and 6, and a pair of coaxial pivot pin portions 7 and 8 which are integral with the hinge wings 5 and 6 and extend therefrom in the manner shown in FIGS. 6 and 7. These pin portions 7 and 8 form a pivot means which defines a turning axis for the rear wall 2. In the particular example illustrated the rear wall 2 as well as the hinge wings 5 and 6 and the pivot means 7, 8 are all formed integrally with each other as by being poured in a suitable mold and made of a plastic material which is fairly rigid when the structure is finished.

As may be seen from FIG. 1, the hinge wings 5 and 6 slidably enter the grooves 1b and 1a, respectively, and the pivot pin portions 7 and 8 extend respectively along the cutouts or notches 9 and 10 up to the bottom face of the bottom wall of the housing 1 and the top face of the top wall of the housing 1, respectively. These cutouts or notches are located within the cap members 3 and 4, and as a result these cap members engage the pivot pin portions 7 and 8 and maintain the latter in an operative position within the notches 9 and 10 which form a bearing for the pivot pin portions 7 and 8. Of course, when the bottom cap member 4 and the upper viewfinder housing 3 are removed the rear wall 2 can simply be moved away from the camera housing 1, while when the rear wall 2 is assembled with the housing 1 the cap members 3 and 4 by their connection with the housing 1 serve to maintain the rear wall 2 assembled with the housing 1. The manner in which the cap-shaped viewfinder housing 3 cooperates with the pivot pin portion 8 in the notch 10 is shown most clearly in FIG. 4, the cap member 4 cooperates with the pivot pin portion 7 in the notch 9 in the very same way.

The rear wall 2 is maintained closed by a releasable lock member 11 of conventional construction shown, for example, in French patent 1,133,512. Moreover, as is indicated at 20 in FIG. 2, the housing 1 and the rear wall 2 have a labyrinth tongue-and-groove cooperation with each other along the top and bottom edges of the rear wall 2 so as to provide light-tightness in a well known manner.

In the embodiment of the invention which is illustrated in FIG. 5 and FIGS. 9–13 the rear wall 2' of the camera is formed with openings 12 and 13 respectively passing through the hinge wings 6' and 5'. These openings are of course coaxial, and the camera housing 1 is formed in its top and bottom walls with the same grooves 1a and 1b, respectively, but with openings 14 and 15 respectively passing through the top and bottom walls across the grooves 1a and 1b, respectively, these openings 14 and 15 also being coaxial with each other.

Figure 9:
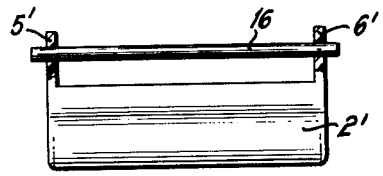
FIG. 9 is an end view of the rear camera wall of the embodiment of FIG. 5 shown together with a hinge pin.
Figure 10:
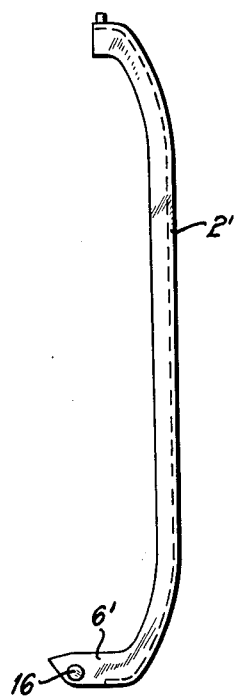
FIG. 10 is an end view of the structure of FIG. 11 as seen from the right of FIG. 11.
Figure 11:
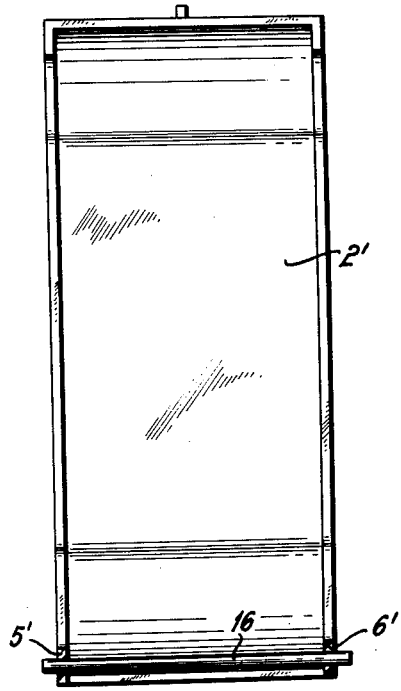
FIG. 11 is a top plan view of the structure of FIG. 9.

In assembling this embodiment the hinge wings 5' and 6' are placed in the grooves 1b and 1a with the openings 13 and 12 respectively aligned with the openings 15 and 14, and then an elongated hinge pin 16 is passed through all of the aligned openings, as is apparent from FIGS. 5, 9 and 11. The manner in which the openings 12 and 13 are aligned with the openings 14 and 15 before the hinge pin is passed through these aligned openings is particularly apparent from FIG. 12.

Of course, at this time, which is to say without the cap members 3 and 4 attached to the top and bottom walls of the housing 1, the hinge pin 16 is free to move axially. However, as is apparent from FIGS. 5 and 12, when the cap members 3 and 4 are connected to the top and bottom walls of the housing 1 they serve the additional function of cooperating with the ends of the hinge pin 16 to prevent axial movement of the latter, and thus the cap members 3 and 4 of the embodiment of FIGS. 5 and 9–13 also cooperate with the pivot means of the hinge assembly to maintain this pivot means in its operative position.

In the embodiment of FIGS. 5 and 9–13 the rear wall 2' can also be molded in its entirety of plastic in a single operation, and as part of this molding operation the openings 12 and 13 are formed in the hinge wings 6' and 5'.

It will be understood that each of the elements described above, or two or more together, may also find a useful application in other types of hinge arrangements differing from the types described above.

While the invention has been illustrated and described as embodied in hinge arrangements for cameras or the like, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A hinged camera casing comprising, in combination, a hollow housing having upper and lower ends; upper and lower cap members respectively carried by said upper and lower ends of said housing; a wall closing said hollow housing and having at one end upper and lower hinge wings, said housing being formed with recesses receiving part of said wings, respectively, and with cutouts communicating with said recesses; and pivot means operatively connected with said wings and forming a pivot axis for said wall about which the latter turns between a closed position closing the hollow interior of said housing and an open position opening the hollow interior of said housing, said pivot means extending into said cutouts, said cutouts communicating with the interior of said cap members and said cap members cooperating with said pivot means to maintain the latter in said cutouts in an operative position forming the turning axis for said wall.

2. In a camera, in combination, a camera housing open at a rear portion thereof and having top and bottom walls respectively formed at one end of said camera housing with a pair of grooves and with a pair of cutouts respectively extending from said grooves through said walls to the top and bottom faces of said top and bottom walls, respectively; a viewfinder housing carried by said top wall of said camera housing, the cutout of said top wall being located within said viewfinder housing and closed by the same; a bottom cap member carried by said bottom wall of said housing and the cutout of said bottom wall being located in said bottom cap member and closed by the same; a rear wall carried by said housing for opening and closing the same and including a pair of hinge wings respectively located slidably in said grooves; and a pair of pivot projections fixed to said hinge wings and extending therefrom along said cutouts, respectively, said viewfinder housing and said bottom cap member being in contact with said projections for maintaining the latter in said cutouts in an operative position where they define a turning axis for said rear wall.

3. In a camera, in combination, a camera housing open at the rear and having top and bottom walls respectively formed at one end of said housing with a pair of grooves, respectively, as well as with a pair of openings respectively extending through said top and bottom walls across said grooves thereof and said openings being coaxial; a viewfinder housing carried by said top wall; a bottom cap member carried by said bottom wall; a rear wall located at the open rear of said housing for closing and opening the latter, said rear wall fixedly carrying a pair of hinge wings which respectively extend slidably into said grooves and which are respectively formed with openings aligned with said openings of said top and bottom walls; and an elongated hinge pin extending through all of said aligned openings into said viewfinder housing at one end of said hinge pin and said bottom cap member at the opposite end of said hinge pin, said viewfinder housing and bottom cap member both abutting said hinge pin to prevent axial movement of the latter.

4. A hinged casing for a camera, comprising, in combination, a housing part open on one side and including top and bottom walls having lateral edges formed with a pair of cutouts extending to the top and bottom faces of said top and bottom walls, respectively; upper and lower cap members respectively fixed to said housing part and having wall portions overlapping said edges of said top and bottom walls and closing said cutouts to form with the same a pair of bearings; a closure part located at said open side of said housing part for closing and opening said open side, said closure part having a pair of hinge wings respectively overlapping said cutouts; and pivot pin means located in said bearings and being retained in said cutouts by said overlapping wall portions of said cap members, said pivot pin means being operatively connected to said closure part so that the same is supported for turning movement on said housing part.

5. A hinged casing for a camera, comprising, in combination, a housing part open on one side and including top and bottom walls having lateral edges formed with a pair of cutouts extending to the top and bottom faces of said top and bottom walls, respectively; upper and lower cap members respectively fixed to said housing part and having wall portions overlapping said edges of said top and bottom walls and closing said cutouts to form with the same a pair of bearings; and a closure part located at said open side of said housing part for closing and opening said open side, said closure part having a pair of hinge wings respectively overlapping said cutouts; and a pair of pivot pins fixedly secured to said hinge wings, respectively, and located in said bearings, said pivot pins being retained in said cutouts by said overlapping wall portions of said cap members so that said closure part is supported for turning movement on said housing part.

6. A hinged casing for a camera, comprising, in combination, a housing part open on one side and including top and bottom walls having lateral edges formed with a pair of cutouts extending to the top and bottom faces of said top and bottom walls, respectively; upper and lower cap members respectively fixed to said housing part and having wall portions overlapping said edges of said top and bottom walls and closing said cutouts to form with the same a pair of bearings; a closure part located at said open side of said housing part for closing and opening said open side, said closure part having a pair of hinge wings respectively overlapping said cutouts, said hinge wings being respectively formed with aligned openings registering with said cutouts and with said bearings; and a pivot pin passing through said bearings and said openings and being retained in said cutouts by said overlapping wall portions of said cap members so that said closure part is supported for turning movement on said housing part.

7. A hinged casing for a camera, comprising, in combination, a housing part open on one side and including top and bottom walls formed with a pair of openings; upper and lower cap members respectively fixed to said housing part, and having wall portions overlapping the edges of said top and bottom walls; a closure part located at said open side of said housing part for closing and opening said open side, said closure part having a pair of hinge wings respectively overlapping said openings, said hinge wings being respectively formed with aligned openings registering with said openings; and a pivot pin passing through said openings so that said closure part is supported for turning movement on said housing part, the ends of said pivot pin abutting said wall portions of said upper and lower cap members, respectively, whereby axial movement of said pivot pin is prevented.

8. A casing for a camera comprising, in combination, a housing part open on one side and including top and bottom walls having lateral edges formed with a pair of cutouts; a closure part located at said open side of said housing part for closing and opening said open side; pivot pin means connected to said closure part and fitting into said cutouts; and upper and lower cap members fixed to said housing part and having wall portions overlapping said edges of said top and bottom walls and closing said cutouts to retain said pivot pin means in said cutouts and to form with the same a pair of bearings for said pivot pin means so that said closure part is supported for turning movement on said housing part.

9. A casing for a camera comprising, in combination, a housing part open on one side and including top and bottom walls having lateral edges formed with a pair of cutouts extending to the top and bottom faces of said top and bottom walls, respectively; a closure part located at said open side of said housing part for closing and opening said open side; pivot pin means connected to said closure part and fitting into said cutouts; upper and lower cap members fixed to said housing part and having wall portions overlapping said edges of said top and bottom walls and closing said cutouts to retain said pivot pin means in said cutouts and to form with the same a pair of bearings for said pivot pin means so that said closure part is supported for turning movement on said housing part; and means for securing said upper and lower cap members to said housing part.

References Cited in the file of this patent

UNITED STATES PATENTS

| | | |
|---|---|---|
| 2,460,488 | Brunetti | Feb. 1, 1949 |
| 2,571,909 | Magnenat | Oct. 16, 1951 |
| 2,693,137 | Roehrig | Nov. 2, 1954 |
| 2,796,190 | Tupper | June 18, 1957 |